(No Model.) 7 Sheets—Sheet 1.

L. H. NASH.
WATER METER.

No. 562,144. Patented June 16, 1896.

WITNESSES:

INVENTOR
Lewis Hallock Nash
BY
Johnson & Johnson
HIS ATTORNEYS.

(No Model.)  7 Sheets—Sheet 2.

L. H. NASH.
WATER METER.

No. 562,144.  Patented June 16, 1896.

WITNESSES:  INVENTOR
  Lewis Hallock Nash
  BY
  HIS ATTORNEYS (No Model.)

L. H. NASH.
WATER METER.

No. 562,144.

7 Sheets—Sheet 3.

Patented June 16, 1896.

WITNESSES:

INVENTOR
Lewis Hallock Nash
BY
Johnson & Johnson
His Attorneys.

(No Model.)  L. H. NASH.  7 Sheets—Sheet 4.
WATER METER.

No. 562,144. Patented June 16, 1896.

WITNESSES:  INVENTOR
Lewis Hallock Nash
BY
His ATTORNEYS.

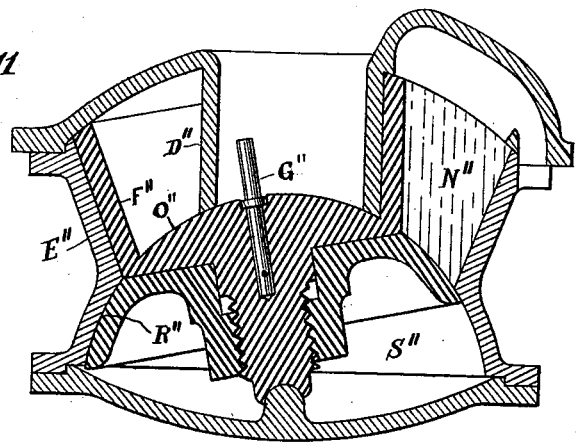
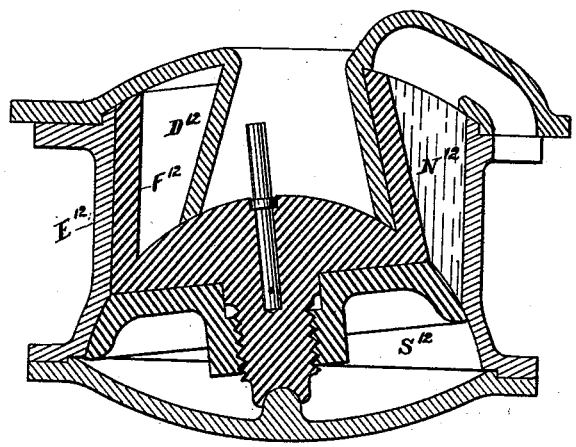
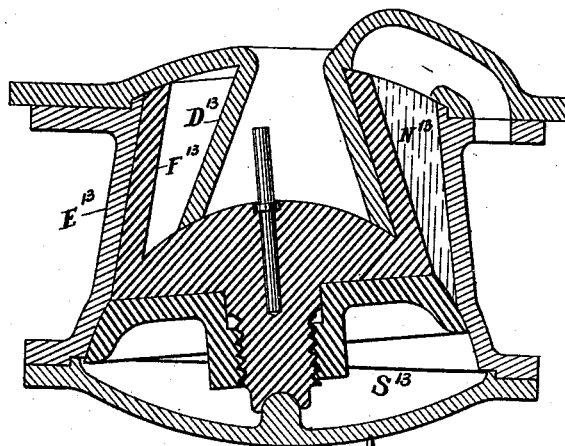

(No Model.) 7 Sheets—Sheet 6.

L. H. NASH.
WATER METER.

No. 562,144. Patented June 16, 1896.

WITNESSES:

INVENTOR
Lewis Hallock Nash
BY
Johnson & Johnson
His ATTORNEYS.

(No Model.) 7 Sheets—Sheet 7.

L. H. NASH.
WATER METER.

No. 562,144. Patented June 16, 1896.

WITNESSES:

INVENTOR
Lewis Hallock Nash
BY
Johnson & Johnson
His ATTORNEYS.

UNITED STATES PATENT OFFICE.

LEWIS HALLOCK NASH, OF SOUTH NORWALK, CONNECTICUT, ASSIGNOR TO THE NATIONAL METER COMPANY, OF NEW YORK, N. Y.

WATER-METER.

SPECIFICATION forming part of Letters Patent No. 562,144, dated June 16, 1896.

Application filed December 23, 1893. Serial No. 494,559. (No model.)

*To all whom it may concern:*

Be it known that I, LEWIS HALLOCK NASH, a citizen of the United States, residing at South Norwalk, in the county of Fairfield and State of Connecticut, have invented certain new and useful Improvements in Water-Meters, of which the following is a description.

My present invention relates to water-meters in which the piston operates with a motion of nutation; and it consists of certain parts and combinations of parts specifically pointed out in the claims concluding this specification.

Figure 1:
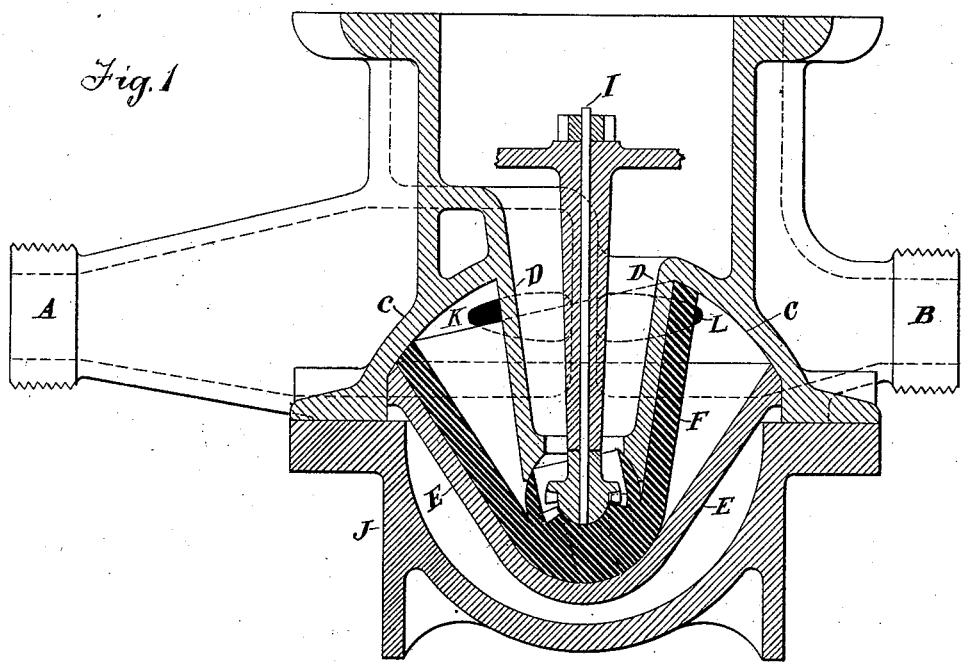
Figure 2:
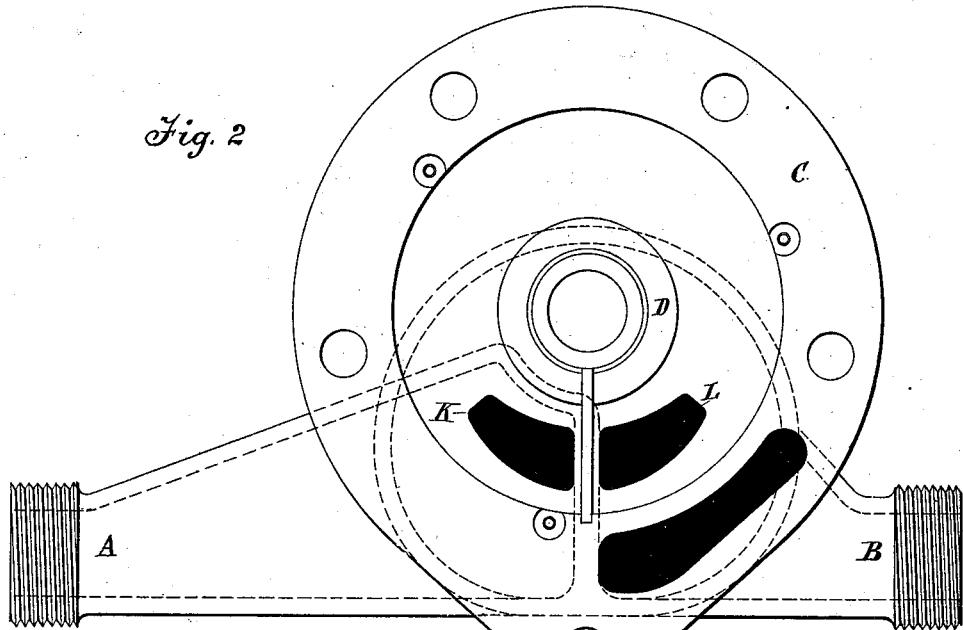
Figure 3:
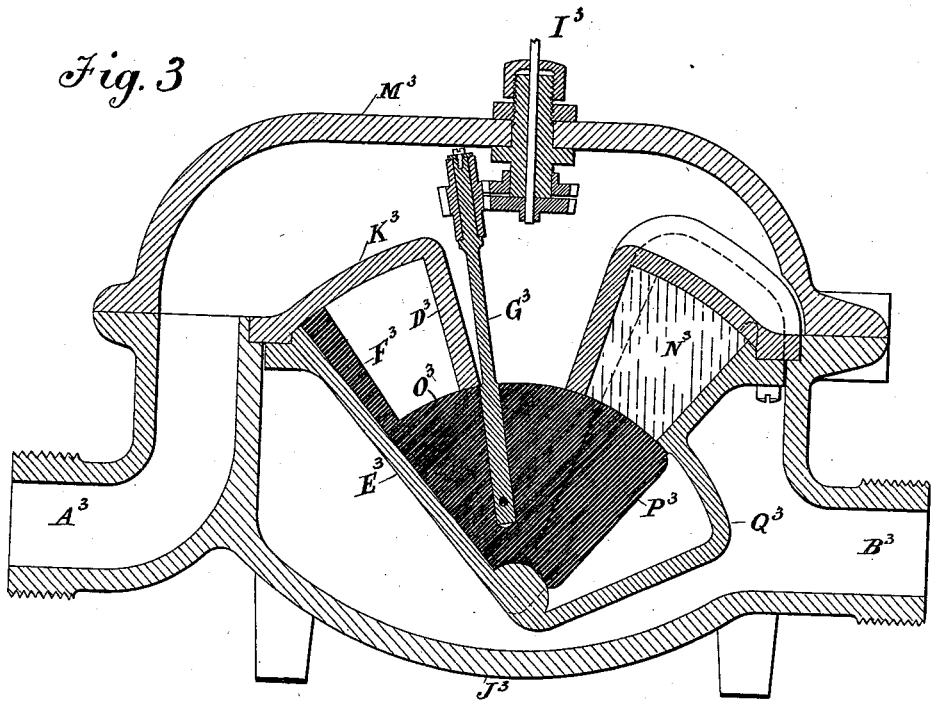
Figure 4:
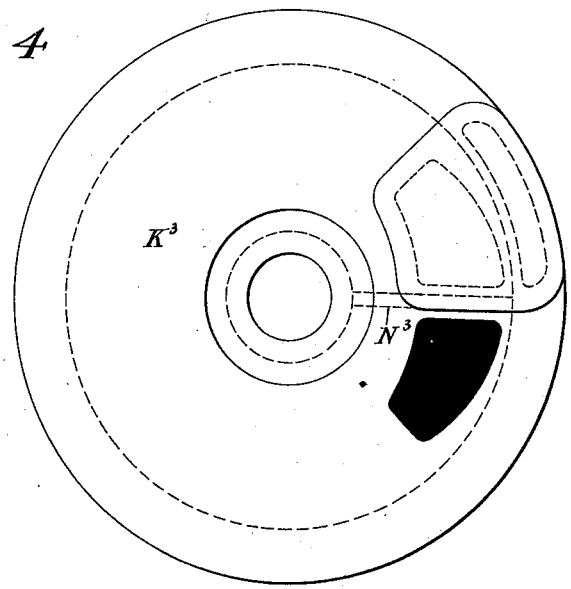
Figure 5:
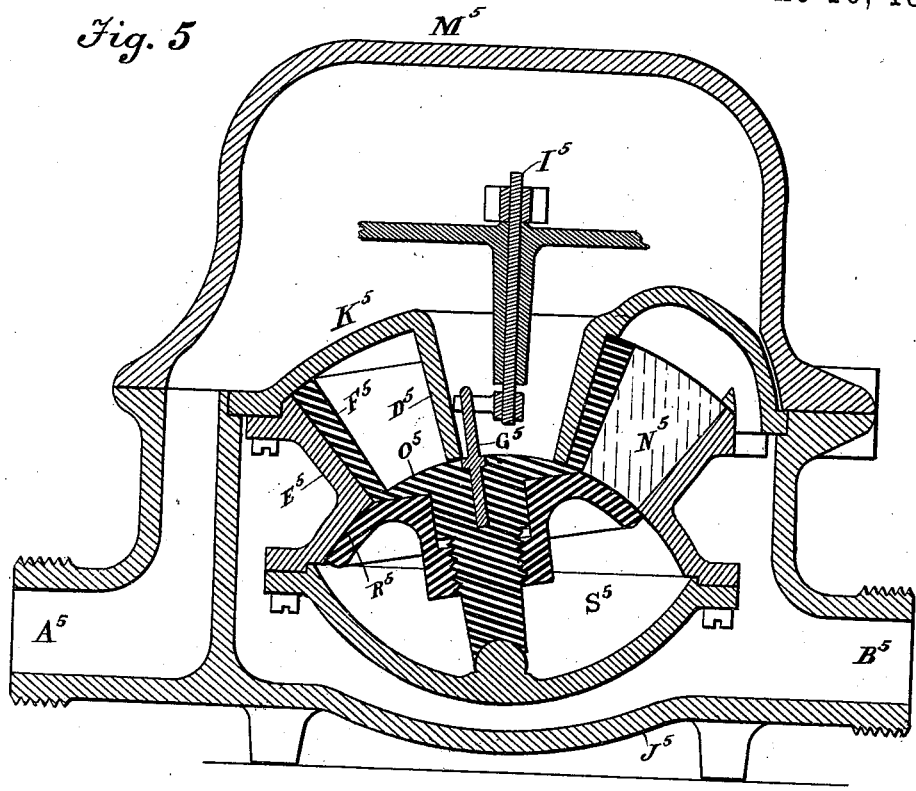
Figure 6:
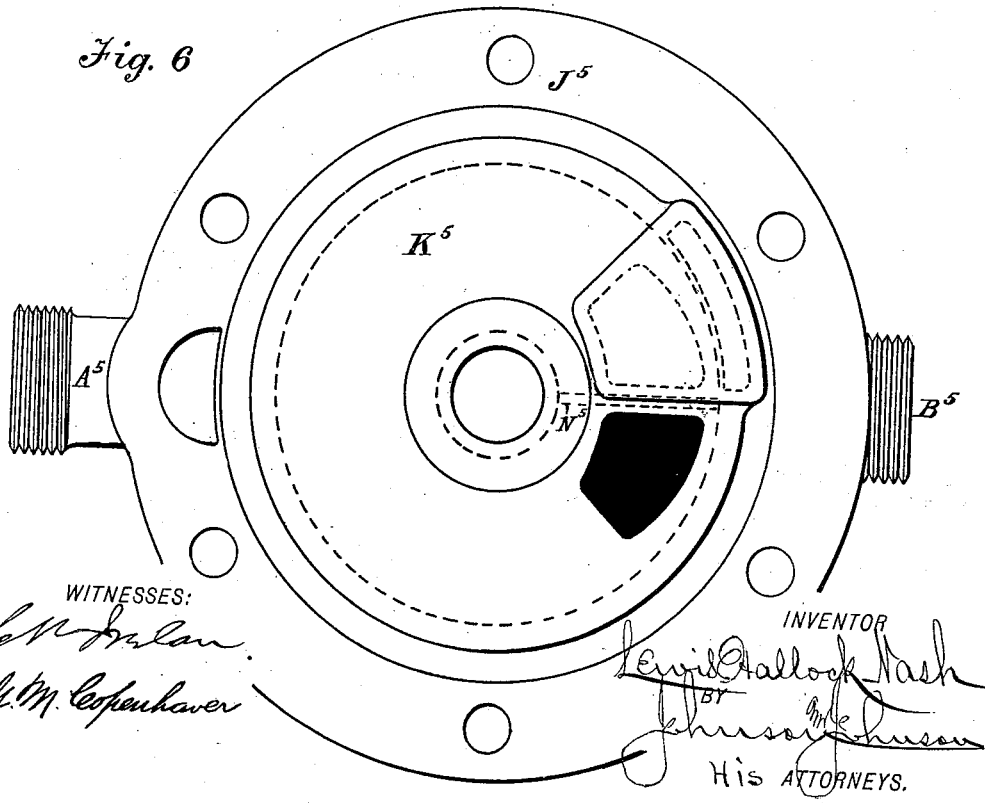
Figure 9:
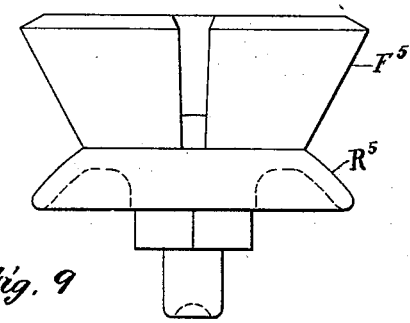
Figure 7:
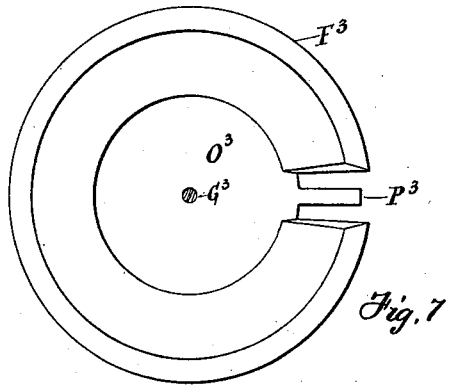
Figure 10:
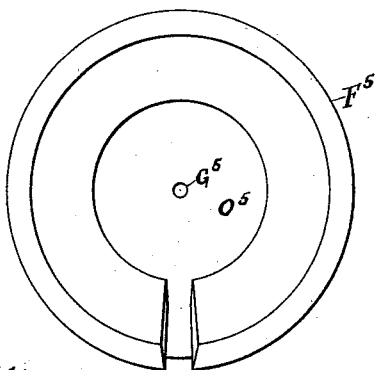
Figure 8:
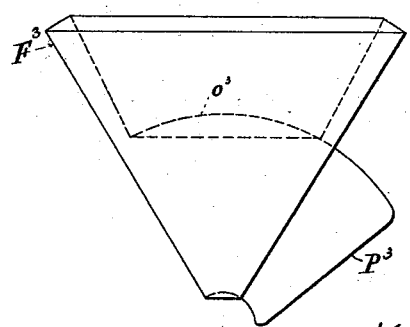

In the accompanying drawings, Figure 1 is a vertical section through a water-meter. Fig. 2 is a bottom view of the upper section of the case. Fig. 3 is a vertical section through a meter, and Fig. 4 is a top view of the upper cone of the measuring-chamber. Fig. 5 is a vertical section through a meter; and Fig 6 is a top view of the structure, the cover being removed. Fig. 7 is a top view of the piston shown in Fig. 3, and Fig. 8 is a side view of the same. Fig. 9 is an elevation of the piston shown in Fig. 5, and Fig. 10 is a top view of the same. Figs. 11, 12, 13, 14, and 15 each show vertical sections through other modified forms of meters. Figs. 16, 17, 18, and 19 show detail parts of Figs. 1 and 2. Similar reference-letters indicate the same or corresponding parts in all the drawings.

Nutating-piston meters are now well known. One of the objections to the known forms of such meters is the fact that when the ball of the piston becomes worn the edge of the piston is not automatically withdrawn from contact with the spherical side walls of the case. As the principal friction occurs at the ball-bearing this part of the structure is most liable to wear and contact between the edge of the piston and the spherical walls of the case most injuriously affect both the accuracy and life of the meter. One of the distinguishing characteristics of my improved nutating-piston meter is the embodiment of the nutating principle in a structure in which when the ball or spherical bearing of the piston wears the rim of the piston will be automatically withdrawn from contact with the spherical walls of the case. This principle may be embodied in various forms, some of which are shown in the accompanying drawings. The outer side surface of the measuring-chamber can be anything from a cone, the apex pointing downward, up to a cylindrical surface, and on beyond to a conical surface with the apex pointing upward, the only limitation being in the case of a cone with the apex downward, in which case obviously the inclination of the sides must be sufficiently great to produce a force due to gravity which will overcome the force due to centrifugal action when the disk is in operation.

The piston may be anything from a cone with its apex downward up to a cylinder and on beyond to a truncated cone with its apex upward.

All the chamber bounded by the spherical wall of the measuring-chamber and its two side or end walls may be used to contain and measure water, or only a portion of the chamber between the spherical wall and the side or end walls, or an extension thereof, may be used for this purpose.

In this specification I have shown various forms of meters involving the novel and useful features above pointed out, and I claim herein, among other things, broadly, such novel features, while I have in other pending applications made specific claims to certain features herein shown, but which by the rules of the office I am precluded from specifically claiming herein. I refer to my applications, Serial Nos. 467,008, filed March 21, 1893, 496,733, 496,734, and 496,735, the three last-mentioned being filed January 13, 1894.

The following is a description of the accompanying drawings:

Referring to Fig. 1, A is the inlet-spud, and B the outlet-spud. C C is the spherical wall of the measuring-chamber. D D is a cone forming one of the ends of the measuring-chamber, and E E a cone forming the other end. F is a conical piston provided with a ball-bearing. The spindle I connects with the registering mechanism of the meter. J is the lower case of the meter-case. K is the inlet-port, and L the outlet-port. It will be observed that the effect of wear at the ball-bearing of the piston when the meter is made in this form is to withdraw the rim of the piston from contact with the spherical walls C C of the case. In my structure having this relation of parts the desired effect will be obtained, to wit: When the ball or its seat wears, the rim of the piston will be withdrawn from the spherical walls of the case.

Referring to Fig. 3, $A^3$ is the inlet-spud, and $B^3$ the outlet-spud. $M^3$ is the upper case, and $J^3$ the lower case, of the meter. $K^3$ are the spherical walls of the measuring-chamber. $E^3$ is the conical outer side plate, and $D^3$ the conical inner side plate, of the measuring-chamber. $F^3$ is the piston. $G^3$ is the stud projecting from the piston-carrying mechanism which operates by differential gearing the pinion $I^3$ connected to the dial mechanism of the meter. $N^3$ is the diaphragm or abutment in the meter-chamber. The general form of the measuring-chamber in Figs. 1 and 3 is the same, that is to say, in both the measuring-chamber is contained between a spherical surface $K$ or $K^3$ and two conical surfaces $E$ and $E^3$ and $D$ $D^3$, the cones of both pointing downward. The structure of Fig. 3, however, differs from that shown in Fig. 1 in that only a portion of the space formed between these surfaces, or an extension thereof, is employed as a measuring-chamber. In Fig. 3 a portion of the cone is closed or made solid by the spherical part $O^3$ which abuts against the lower end of the cone $D^3$. The whole of the space on the outside of the piston between the walls of the measuring-chamber is, however, utilized for measuring water. $P^3$ is a radial extending flange projecting in a line with and under the abutment $N^3$ to make a joint therewith. The outer side plate $E^3$ of the measuring-chamber is provided with a radial extension of the chamber $Q^3$ in which the wing $P^3$ works. This piston is shown in detail in Figs. 7 and 8.

Fig. 5 shows a meter in which the measuring-chamber is like the measuring-chamber of Figs. 1 and 3 in that it is formed between a spherical surface $K^5$ and two conical surfaces $E^5$ and $D^5$, both cones having their apices downward. It differs, among other things, from the structure shown in Fig. 3 in that not all of the space between the conical walls, or an extension thereof, on the outside of the piston is provided not only with the spherical interior surface $O^5$, as the piston in Fig. 3 is provided with the interior spherical surface $O^3$, but it is also provided with an exterior spherical surface $R^5$ abutting against and making a joint with the lower edge of the lower conical surface $E^5$. This spherical outwardly-projecting flange extends entirely around the piston and makes a joint with the lower edge of the abutment $N^5$. The case is provided with a chamber $S^5$ below the piston in which this outwardly-projecting spherical flange of the piston works. The piston of Fig. 5 is shown in detail in Figs. 9 and 10.

Referring to the spherical part $O^3$ of Fig. 3 and $O^5$ and $R^5$ of Fig. 5, it will be observed that these surfaces not only define the lower limits of the measuring-chamber, but making contact, as they do, with the lower edges of the conical surfaces $D^3$, $D^5$, and $E^5$ they form a stop or guide which prevents the piston by any agency being lifted upward so as to press their edges or peripheries against the spherical walls of the cases.

Figs. 11 to 15, inclusive, show only the measuring-chambers of meters with the cases and connections with the registering mechanism omitted.

The measuring-chamber of Fig. 11 differs from that of Fig. 5 in that the inner side plate is cylindrical instead of being conical.

In Fig. 12 the outer side surface $E^{12}$ is cylindrical while the inner side surface $D^{12}$ is conical, the apex of the cone being upward. The disk of the piston in this case is conical, the cone of which it is a part having its apex upward.

In Fig. 13 both side plates are conical, the cones both having their apices pointing upward.

Figure 14:
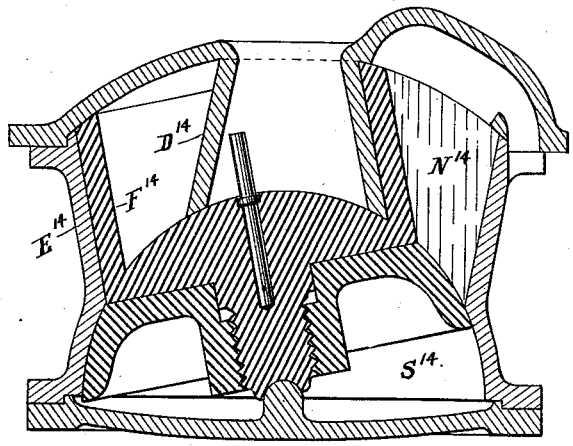

Fig. 14 shows the measuring-chamber of a meter in which the outer side surface is conical, the apex being downward, and the inner side surface is conical, the apex being upward, the disk $F^{14}$ of the piston in this case being cylindrical.

Figure 15:
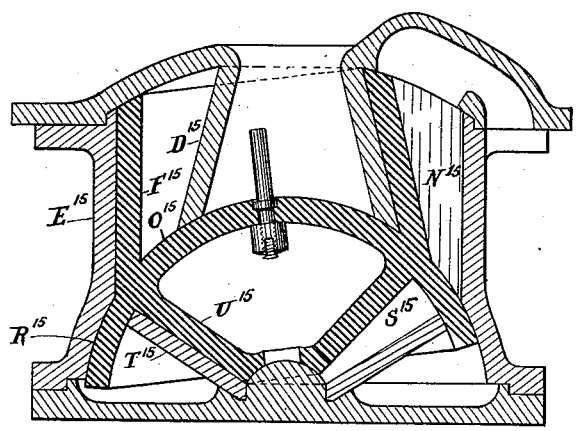
Figure 16:
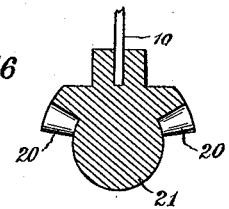
Figure 17:
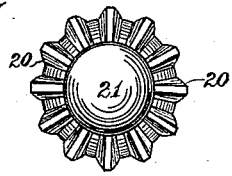
Figure 18:
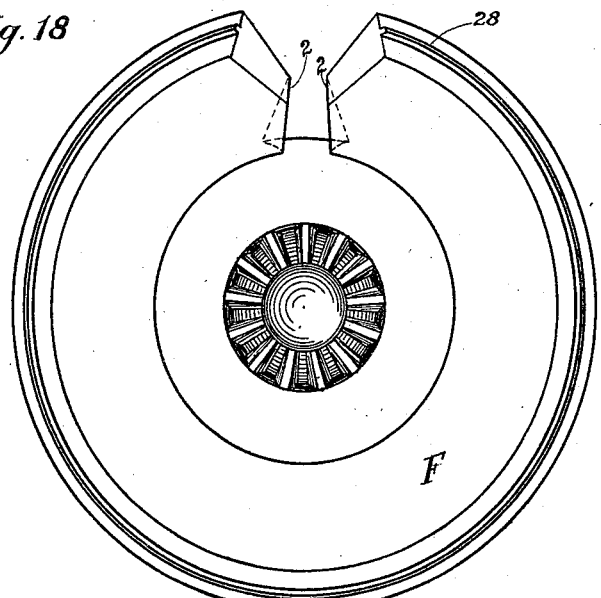
Figure 19:
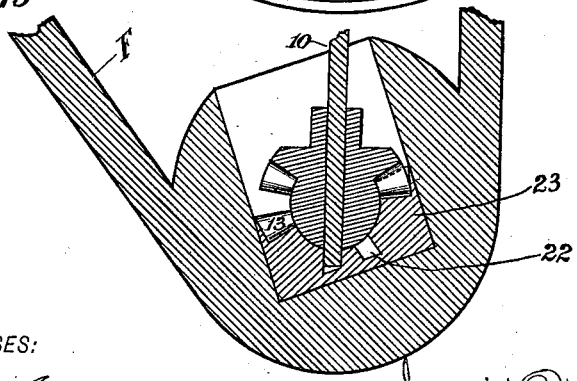

Fig. 15 shows substantially the same form of measuring-chamber as does Fig. 12 and a similarly-shaped piston; but in this case the chamber $S^{15}$ is used as a measuring-chamber below the spherical surfaces $R^{15}$ $O^{15}$, said chamber being formed by a conical plate $T^{15}$ and a conical extension $U^{15}$ on the piston, and is provided with suitable ports of the form well known in nutating pistons and not shown in the drawings.

All the forms described by me possess in common this feature, to wit: The lower edge of the spherical surface of the measuring-chamber is so located above all parts of the seat in the case of the spherical ball of the piston that when wear occurs in the ball-bearing the rim of the piston is substantially withdrawn from the spherical walls of the case, avoiding contact and friction there, which are extremely injurious to the accuracy of the meter and which endangers the life of the parts. Many other modifications involving this same general principle might be illustrated and described.

Figs. 1, 3, and 5 show substantially the same form of measuring-chamber with different forms of pistons utilizing more or less of the space between the end surfaces of the measuring-chamber, or extensions thereof, for metering water, while Figs. 11 to 14 show different forms of chambers, and Fig. 15 shows a double-acting structure of the same general type as Fig. 13.

Figs. 16, 17, 18, and 19 show on an enlarged scale the construction of the piston of Fig. 1. F F is the piston, provided at its periphery with a knife-edge projection 28. At a point intermediate between its ball-bearing and its periphery is a contact-bearing 2 2, which bearing operates in connection with the diaphragm or abutment in the measuring-chamber. By providing a bearing-surface 2 2 intermediate between the ball-bearing and the periphery of the piston I obtain the necessary freedom of motion with less width of slot than if the bearing were either at the ball-bearing or at the periphery and, at the same time, less friction is occasioned between the bearing and the diaphragm. When the central line of the flanges of the piston does not pass through the center of motion of the piston, but is tangent to a circle described about that point, the motion of the piston requires its slot where it straddles the abutment to be wider than it of necessity is when the central line of the flanges pass through the center of motion. The piston is provided at or near its center of motion with a beveled gear 13, which operates in connection with a beveled gear 20 on the lower end of the spindle 10, which connects with the registering mechanism. 21 is a ball-joint which fits and operates in a corresponding socket cut in the piece 23. 22 is an annular groove in which a projection of the spindle 10 below the spherical surface 21 of the ball-joint operates. The gears 13 and 20 consist of a differential train constituting speed-reducing mechanism in the well-known way.

In the foregoing specification I have referred to different modifications which might be employed in practicing my invention; but I desire it to be distinctly understood that mention by me of these modifications is in no way intended to exclude others not referred to but which are within the spirit and scope of my invention.

Many of the combinations and details illustrated and above described are not essential to the several features of my invention separately and broadly considered. This will be indicated in the concluding claims, where the omission of an element or the omission of reference to the detail features of the elements mentioned is intended to be a formal declaration of the fact that the omitted features or elements are not essential to the inventions therein severally covered.

What I claim is—

1. In a nutating-piston water-meter, the combination with a piston and a measuring-chamber having side surfaces and a spherical surface, the outer side surfaces sloping in straight lines downward from their juncture with the spherical surface.

2. In a nutating-piston water-meter the combination of a piston and a case having a spherical surface and opposite side surfaces both of the side surfaces being conical with their apices pointing downward.

3. In a water-meter the combination with a measuring-chamber of a piston operated therein with a motion of nutation a gear attached to the piston, registering mechanism, a gear attached to said mechanism which forms with the gear attached to the piston a differential train, and a ball-and-socket guide connection between said elements.

4. In a nutating-piston water-meter the combination of a piston the outer surfaces of the flanges of which are tangent to the ball of the piston in combination with a measuring-chamber and its diaphragm, the slot in said piston making bearing with said diaphragm at a point midway between its rim and its ball-bearing.

5. In a nutating-piston water-meter a piston the outer walls of the flanges of which are tangent to the ball of the piston said piston operating with its apex downward.

LEWIS HALLOCK NASH.

Witnesses:
EMMA A. BROWER,
M. WILSON.